United States Patent
Voutour

(10) Patent No.: US 9,742,756 B1
(45) Date of Patent: *Aug. 22, 2017

(54) SYSTEMS AND METHODS FOR COMMUNICATIONS CHANNEL AUTHENTICATION

(71) Applicant: United Services Automobile Association (USAA), San Antonio, TX (US)

(72) Inventor: Teddy Joseph Edmond Voutour, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 34 days.

This patent is subject to a terminal disclaimer.

(21) Appl. No.: 15/003,499

(22) Filed: Jan. 21, 2016

Related U.S. Application Data

(63) Continuation of application No. 12/182,293, filed on Jul. 30, 2008, now Pat. No. 8,258,286.

(51) Int. Cl.
*G06F 7/04* (2006.01)
*H04L 29/06* (2006.01)

(52) U.S. Cl.
CPC .............. *H04L 63/08* (2013.01); *H04L 63/10* (2013.01)

(58) Field of Classification Search
CPC ..... H04L 63/08; H04L 63/10; H04L 63/0428; G06F 21/6218
See application file for complete search history.

(56) References Cited

U.S. PATENT DOCUMENTS

| | | | |
|---|---|---|---|
| 6,782,080 B2 * | 8/2004 | Leivo ...................... | G06F 21/42 379/142.05 |
| 7,805,362 B1 * | 9/2010 | Merrell .................. | G06Q 20/10 705/36 R |
| 8,474,028 B2 | 6/2013 | Kulkarni et al. | |
| 2005/0078851 A1 | 4/2005 | Jones et al. | |
| 2005/0273442 A1 * | 12/2005 | Bennett .............. | G06Q 20/3674 705/67 |
| 2008/0040276 A1 | 2/2008 | Hammad et al. | |

(Continued)

OTHER PUBLICATIONS

Adida, Ben, "FragToken: Secure Web Authentication using the Fragment Identifier," Harvard, 33 Oxford Street, Cambridge MA 02118. Feb. 3, 2007.

*Primary Examiner* — Ali Abyaneh
(74) *Attorney, Agent, or Firm* — Fish & Richardson P.C.

(57) ABSTRACT

A user may access an Institution system via more than one communications channel, either by the same device (e.g., a mobile device accessing the Institution system via a voice channel and a data channel) or by different devices (e.g., a personal computer via a web channel and a phone via a voice channel). If a user is not currently authenticated to a communications channel and attempts to access the Institution system via a communications channel, the user may be authenticated using strong authentication. If the user is currently authenticated to the Institution system via a communications channel and would like to engage a second communications channel to access the Institution system, the user may authenticate to the second communications channel using both communications channels and weak authentication, such as single factor authentication or a challenge question.

15 Claims, 6 Drawing Sheets

(56) References Cited

U.S. PATENT DOCUMENTS

| | | | |
|---|---|---|---|
| 2008/0086770 A1* | 4/2008 | Kulkarni | H04L 63/0876 726/20 |
| 2008/0098464 A1* | 4/2008 | Mizrah | G06F 21/42 726/5 |
| 2008/0151885 A1 | 6/2008 | Horn et al. | |
| 2008/0155672 A1* | 6/2008 | Sharma | G06F 17/30893 726/7 |
| 2008/0250477 A1 | 10/2008 | Samuelsson et al. | |

* cited by examiner

SYSTEMS AND METHODS FOR COMMUNICATIONS CHANNEL AUTHENTICATION

CROSS-REFERENCE TO RELATED APPLICATIONS

This application is a continuation application of and claims priority to U.S. application Ser. No. 12/182,293, filed on Jul. 30, 2008, which is related by subject matter to that disclosed in the following commonly assigned applications, the entirety of which are hereby incorporated by reference herein: U.S. patent application Ser. No. 12/182,290, and U.S. patent application Ser. No. 12/182,299, each filed on Jul. 30, 2008 and each entitled "Systems And Methods For Communications Channel Authentication."

BACKGROUND

A communications channel refers to the medium used to convey information from a sender to a receiver. Communications channels include voice and data channels. A receiver may have to authenticate to a sender to access the communications channel. An authentication procedure (e.g., involving a user name, password, a pass phrase, a personal identification number (PIN), etc) may establish the Identity of the receiver with some degree of confidence, and the sender may grant access privileges to that identity.

If receiver is authenticated to the sender by a first communications channel and would like to engage a second communications channel to access the sender, the receiver has to separately authenticate to the sender via the second communications channel. This is burdensome and time-consuming to both the sender and the receiver.

SUMMARY

A user may access an Institution system via more than one communications channel, either by the same device (e.g., a mobile device accessing the institution system via a voice channel and a data channel) or by different devices (e.g., a personal computer (PC) via a web channel and a phone via a voice channel).

In an Implementation, if a user is not currently authenticated to a communications channel and attempts to access the institution system via a communications channel, the user may be authenticated using strong authentication. If the user is currently authenticated to the Institution system via a communications channel and would like to engage a second communications channel to access the Institution system, the user may authenticate to the second communications channel using both communications channels and weak authentication, such as single factor authentication or a challenge question.

In an Implementation, a challenge question may be presented to the user via one communications channel, and the user may provide the response via another communications channel. The user may have previously authenticated via one of the communications channels and that session may still be active.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of Illustrative embodiments, is better understood when read in conjunction with the appended drawings. For the purpose of Illustrating the embodiments, there are shown in the drawings example constructions of the embodiments; however, the embodiments are not limited to the specific methods and Instrumentalities disclosed. In the drawings.

DETAILED DESCRIPTION

Figure 1:
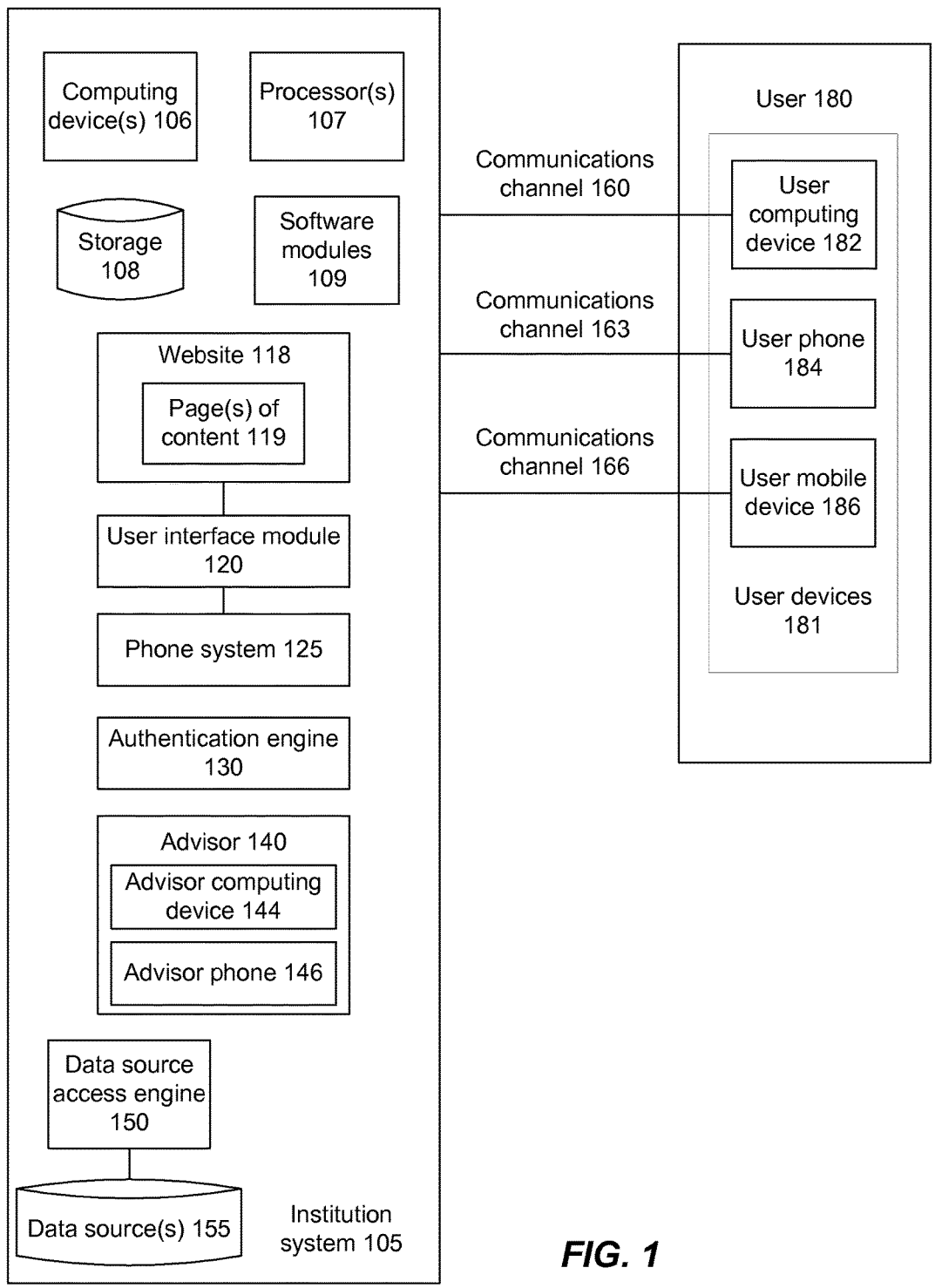
FIG. 1 is a block diagram of an implementation of a system that may be used for communications channel authentication.

FIG. 1 is a block diagram of an implementation of a system that may be used for communications channel authentication. An Institution system 105 may include an authentication engine 130. The authentication engine 130 may authenticate a user 180 who is attempting to access the Institution system with one or more user devices 181 by a communications channel, such as a communications channel 160 associated with a user computing device 182, a communications channel 163 associated with a user phone 184, or a communications channel 166 associated with a user mobile device 186. It is contemplated that more than one of the communications channels 160, 163, 166 may be used by a single user device, such as the user computing device 182, the user phone 184, or the user mobile device 186 to access the Institution system 105, as described further herein.

The user 180 may be seeking access to the institution system 105 to obtain information about an Institution associated with the Institution system 105, an account of the user 180 maintained by the Institution system, products or services, or to speak with an advisor 140, for example. The Institution may be any type of entity or business. For example, the Institution may be a financial services institution, a credit card association or member of a credit card association, a retail bank, an investment bank, an investment company, etc. The Institution system 105 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

Each communications channel may be any type of communications channel, such as voice, data, web, mobile phone, landine phone, etc. The user devices 181 and communications channels described herein are examples only, and any number and any types of user devices 181 and communications channels may be implemented. The user phone 184 may be any type of telecommunications device used to transmit and receive sound, such as a corded telephone, a cordless phone, a mobile phone, etc. The user mobile device 186 may be any type of mobile computing device, such as a handheld computing device or a personal digital assistant (PDA). An example user computing device 182 is described with respect to FIG. 6. Additionally, any number of users with associated user devices may be in communication with the institution system 105.

Each of the user computing device 182, the user phone 184, and the user mobile device 186 may be connected with the Institution system 105 over one or more communications channels of an associated network. It is contemplated that each network may be any type of private or public communication network such as, for example, an intranet, Internet, local area network (LAN), wide area network (WAN), wireless fidelity (WiFi) network, cellular connection, plain old telephone service (POTS), a public switched telephone network (PSTN), a voice over Internet protocol (VoIP) network, and the like. The user computing device 182, the user phone 184, and the user mobile device 186 may be connected to the Institution system 105 over the same network or different networks.

The Institution system 105 may comprise an advisor 140 who may have an associated advisor computing device 144 and advisor phone 146. The advisor 140 may communicate with the user 180 over a communications channel using the advisor computing device 144 or the advisor phone 146. An example advisor computing device is described with respect to FIG. 6, and the advisor phone may be any type of telecommunications device used to transmit and receive sound. Although only one advisor is shown in FIG. 1, it is contemplated that any number of advisors and associated advisor computing devices and advisor phones may be in communication with or otherwise associated with the Institution system 105 and may be used for communication with the user 180.

As described further herein, if the user 180 has already authenticated with the authentication engine 130 via a first communications channel (e.g., using "strong" authentication) and is attempting to authenticate with the authentication engine 130 via a second communications channel, the authentication engine 130 may recognize an active authenticated session on the first communications channel and present an authentication challenge (e.g., a challenge question) to the user 180 over either the first communications channel or the second communications channel. The authentication challenge may be answered by the user 180 through the other communications channel that did not receive the authentication challenge. For example, if the authentication challenge is provided to the user over the first communications channel, the user may answer the challenge over the second communications channel, and vice versa. Because the user 180 has already authenticated on the first communications channel, a simplified or reduced (i.e., "weak") authentication challenge may be presented to the user 180 by the authentication engine 130 on one of the two communications channels which may be answered on the other of the two communications channels.

Strong authentication may be defined as a layered authentication approach relying on two or more authentication factors to establish the identity of a user. An authentication factor is a piece of Information and process used to authenticate or verify a user's identity. Two-factor authentication is a system wherein two different factors are used to authenticate. Using two factors as opposed to one factor delivers a higher level of authentication assurance. Using more than one factor may be called strong authentication, and using just one factor, for example a password or an answer to a challenge question such as a randomized challenge question, may be considered to be weak authentication.

The authentication engine 130 may analyze, process, and store the data from the user 180 and the advisor 140 in one or more data sources 155 via a data source access engine 150. The data may also be stored in other storage, perhaps in storage associated with the Institution system 105 such as storage 108. The authentication engine 130 may use the data to authenticate the user 180 (e.g., via strong authentication, via weak authentication, etc.) to permit the user 180 access to content associated with the institution system 105 via a communications channel through which the user 180 is seeking access. Data that may be stored may include personal data about the user 180, such as user names, passwords, pass phrases, personal identification numbers, and other data that may be used to identify and authenticate the user 180.

The Institution system 105 may include a user interface module 120. The user interface module 120 may generate and format one or more pages of content 119 directed to identification and authentication, for example, as a unified graphical presentation that may be provided to the user computing device 182 as an output from the authentication engine 130. The page(s) of content 119 may be provided to the user computing device 182 via a website 118 associated with the Institution system 105. The page(s) of content 119 may be provided to other devices of the user 180, such as the user phone 184 or the user mobile device 186, depending on the Implementation of the user device.

In an Implementation, instead of hosting the website 118, the institution system 105 may comprise a conventional application server hosting a proprietary online service accessible only a private network. In any event, the Institution system 105 may have appropriate security mechanisms in place to prevent unauthorized third parties from Intercepting the user's information.

The user interface module 120 may provide the user 180 with access to a phone system 125 of the institution system 105. The phone system 125 may be any type of system that may provide information to a device of the user 180, such as the user phone 184 or the user mobile device 186. In an Implementation, the phone system 125 may use any type of phone menu system and may use interactive voice response (IVR) which is a phone technology that allows a computer to detect voice and touch tones using a phone cal. An IVR system can respond with prerecorded or dynamically generated audio to further direct users on how to proceed. IVR systems can be used to control almost any function where the Interface can be broken down into a series of menu choices. For example, the user 180 may dial a phone number that is answered by an IVR system. The IVR system may execute an application which is tied to the number dialed. As part of the application, prerecorded audio files or dynamically generated text to speech audio may explain the options available to the user 180. The user 180 may be given the choice to select options using DTMF (dual-tone multi-frequency) tones or spoken words. Examples of typical IVR applications include telephone banking and credit card transactions.

In an Implementation, the phone system 125 may comprise a voice portal which gives access to information maintained by the Institution system 105 through spoken commands and voice responses. The voice portal could be an access point for any type of information, services, or transactions found on the Internet. A voice portal may be automated and/or Internet-based to provide interactive voice services. Information may also be provided to the user 180 via the advisor 140.

In an Implementation, the user 180 may use the user interface module 120 to interact with the authentication engine 130, for example, to authenticate to the institution system 105 via one or more communications channels. The user 180 may use the user interface module 120 to request or receive information from the Institution system 105, e.g., in conjunction with the data source access engine 150 which may retrieve data from data source(s) 155, storage 108, and other storage internal and/or external to the Institution system 105, in an Implementation.

Data may also be provided to the authentication engine 130 by the user 180 or the advisor 140. The data may be received via the user interface module 120 in an implementation. The retrieved and/or received data may be associated with the user 180 and may be used to authenticate the user 180 and provide access to information maintained by the Institution system 105 via one or more communications channels.

The Institution system 105 may comprise one or more computing devices 106. The user 180 may interact with the computing device(s) 106 via the user computing device 182, the user phone 184, or the user mobile device 186 via the appropriate communications channel. The computing device(s) 106 may have one or more processors 107, storage 106 (e.g., storage devices, memory, etc.), and software modules 109. The computing device(s) 106, including its processor(s) 107, storage 108, and software modules 109, may be used in the performance of the techniques and operations described herein. Information associated with the user 180 and authentication of the user 180 may be stored in storage 108 or other storage such as data source(s) 155, for example.

Examples of software modules 109 may include modules for identifying and authenticating a user, generating web page content for display, generating phone system content, and receiving requests and Instructions from a user, described further herein. While specific functionality is described herein as occurring with respect to specific modules, the functionality may likewise be performed by more, fewer, or other modules. An example computing device and Its components are described in more detail with respect to FIG. 6.

The user 180 may access the institution system 105 via more than one communications channel, either by the same device (e.g., the user mobile device 186 accessing the Institution system 105 via a voice channel and a data channel) or by different devices (e.g., a personal computer via a web channel and a landline phone via a voice channel).

If a user 180 is not currently authenticated to a communications channel and attempts to access the Institution system 105 via a communications channel, the authentication engine 130 may authenticate the user 180 using known strong authentication techniques (e.g., Involving user name, password, pass phrase, PIN, or any other authentication factors).

If the user 180 is currently authenticated to the Institution system 105 via a communications channel (e.g., a voice channel) and would like to engage a second communications channel (e.g., a web channel) to access the institution system 105, the user 180 may authenticate to the second communications channel using both communications channels and weak authentication, such as single factor authentication or a challenge question.

Figure 2:
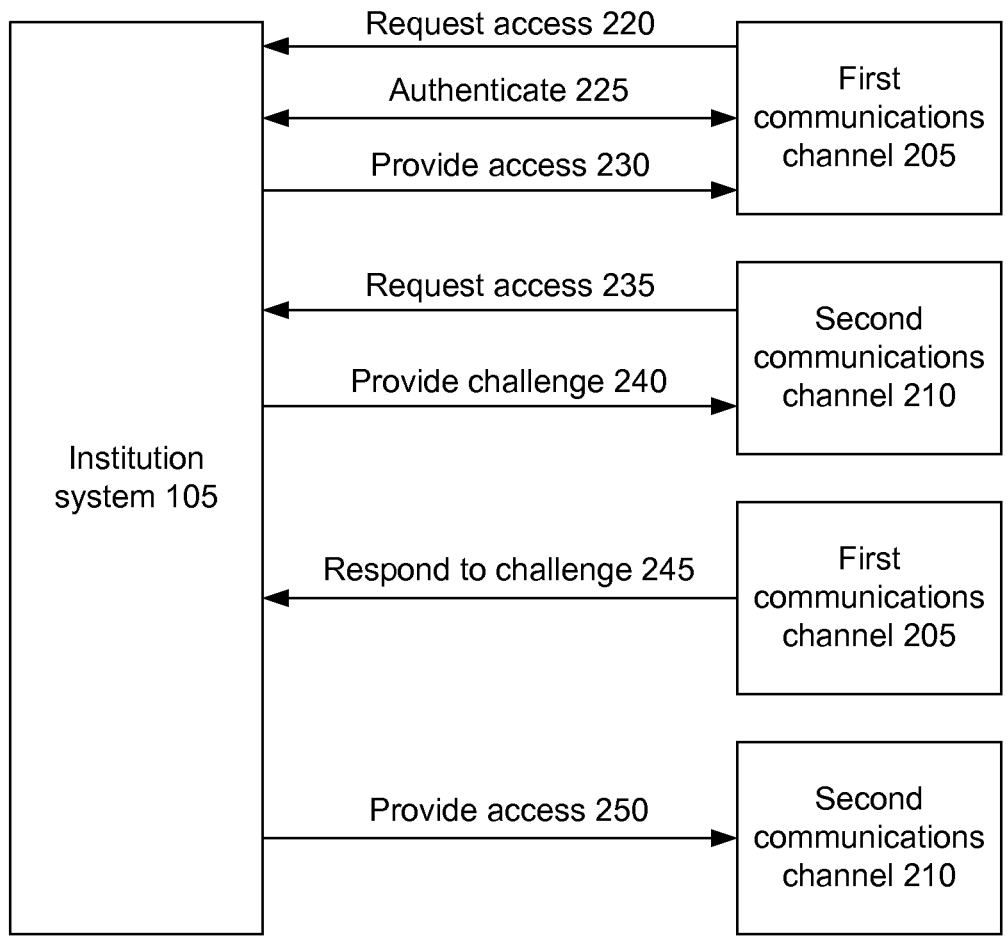
FIG. 2 is diagram of an implementation of an authentication flow over various communications channels.

FIG. 2 is a diagram of an Implementation of an authentication flow 200 over various communications channels. A user may request access 220 to the Institution system 105 via a first communications channel 205 associated with any user device. The user may authenticate 225 via the first communications channel 205, e.g., using strong authentication. Upon successful authentication, a session may be initiated with access provided 230 to the user device to the institution system 105 over the first communications channel 205.

At some point, the user may request access 235 to the Institution system 105 via a second communications channel 210 associated with any user device. If the session involving the first communications channel 205 is still active (i.e., the user device that obtained access to the Institution system 105 over the first communications channel 205 at 230 is still authenticated and has access), a challenge may be provided 240 over the second communications channel 210 to the user device seeking access over the second communications channel 210. The challenge may comprise a challenge question or another form of single factor authentication or weak authentication.

The user may respond to the challenge 245 over the first communications channel 205. If the response is proper to authenticate the user, a session may be initiated with access provided 250 to the user device to the Institution system 105 over the second communications channel 210.

Thus, authentication on a communications channel may be performed in conjunction with another communications channel the user 180 is already authenticated on. In an implementation, the second communications channel authentication challenge may be provided to the user on the second communications channel, and the user may provide the response on the first communications channel. Thus, the user may provide the response to the challenge question for the second communications channel on the first communications channel.

Figure 3:
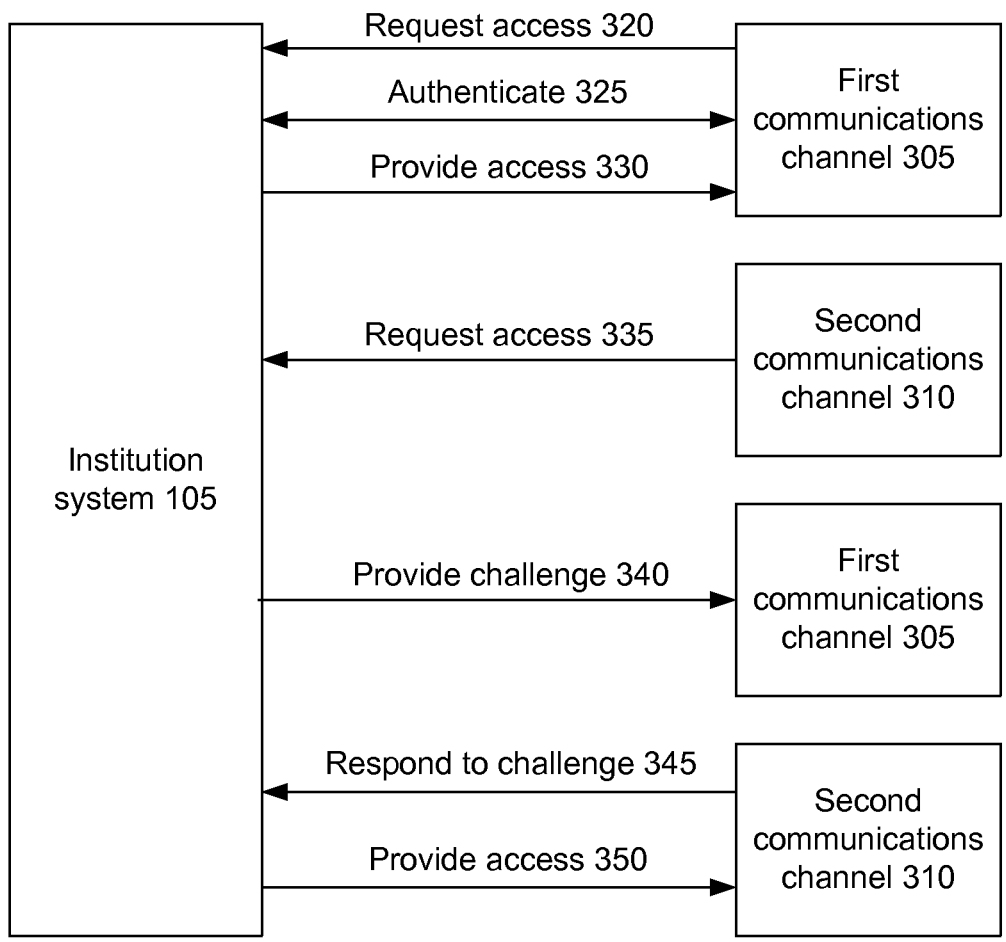
FIG. 3 is a diagram of another implementation of an authentication flow over various communications channels.

FIG. 3 is a diagram of another implementation of an authentication flow 300 over various communications channels. Similar to the authentication flow 200 of FIG. 2, a user may request access 320 to the Institution system 105 via a first communications channel 305, authenticate 325 via the first communications channel 305, e.g., using strong authentication, and a session may be initiated with access provided 330 over the first communications channel 305.

At some point, the user may request access 335 to the Institution system 105 via a second communications channel 310. If the session involving the first communications channel 305 is still active, a challenge may be provided 340 over the first communications channel 305 to the user device having access to the Institution system 105 over the first communications channel 305. As with the authentication flow 200, the provided challenge 340 may comprise a challenge question or another form of single factor authentication or weak authentication.

The user may respond to the challenge 345 over the second communications channel 310 with the user device that is seeking access over the second communications channel 310. If the response is proper to authenticate the user, a session may be initiated with access provided 350 to the user device to the Institution system 105 over the second communications channel 310.

Therefore, credentials of the first communications channel may be used in the authentication on the second communications channel. In this manner, the secured session of the first communications channel may be extended to cover both communications channels. Multiple channel communication provides convenience for users, and the usability for the combination of two communications channels is simplified by authentication on the second communications channel via the first communications channel.

Figure 4:
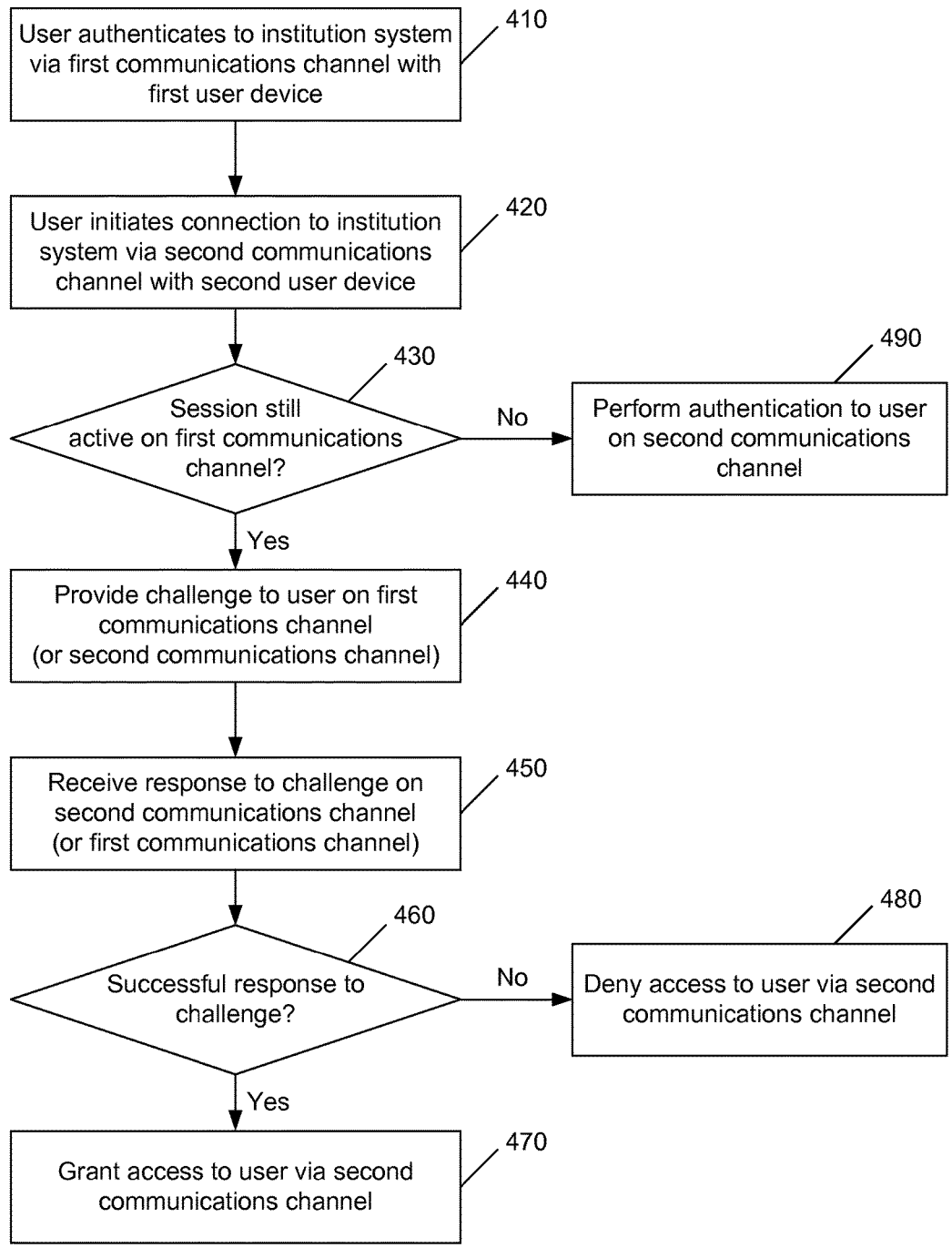
FIG. 4 is an operational flow of an implementation of a method that may be used for communications channel authentication.

FIG. 4 is an operational flow of an implementation of a method 400 that may be used for communications channel authentication. At 410, a user may authenticate to the Institution system via a first communications channel with a first user device in order to connect to the Institution. The authentication may be performed using known authentication techniques such as two-factor authentication or other types of strong authentication. For example, the user may authenticate to a data channel using a PC via the Internet in order to access a website of the Institution system. The user may wish to browse the website for account information, information on products and services, etc.

At some point, at 420, the user may initiate another connection to the Institution system via a second communications channel with a second user device that is different than the first user device. For example, the user may wish to speak with an advisor of the Institution system about a user account, a product or service, etc. In an implementation, the user may initiate this connection by calling the advisor or the Institution system or by requesting a call from the advisor, e.g., via a request made on the website. In this case, the communications channel may be a voice channel.

At 430, it may be determined if the user is still in an active session on the first communications channel (e.g., If the user is already authenticated to the system on another channel, such as the first communications channel). In an implementation, the authentication engine may query the various communications channels to confirm that an authenticated session with the user is already in progress.

If the user is already authenticated to the system on another communications channel, then a weak authentication technique may be performed to authenticate the user on the second communications channel. At 440, a challenge or other type of weak authentication may be provided to the user on the first communications channel, and the user may respond to the challenge on the second communications channel at 450 (or vice versa where the challenge may be provided on the second communications channel and the response may be provided on the first communications channel). For example, the authentication engine may display an object, characters, numbers, or other data to the user via the website (via the first communications channel), and the advisor may ask the user over the voice channel (i.e., the second communications channel) for the user to describe what they see on the display. As another example, the advisor may tell the user to type in a number or authentication code on the website. By doing so, the user may be authenticated on the voice channel. The user may therefore be authenticated using a challenge presented on one communications channel and responding via another communications channel.

It may be determined at 460 if the user successfully responds to the challenge. If so, then the user may be granted access via the second communications channel at 470. The user now has access to the institution system by both communications channels. In this manner, a secured session may be transferred from a first user device to a second user device. Otherwise, the user may not be authenticated for the second communications channel and access may be denied at 480.

If the user is not already authenticated to the Institution system on another communications channel as determined at 430 or such a session is inactive, strong authentication may be performed at 490 using known authentication techniques for the user to access the Institution system via the second communications channel.

Figure 5:
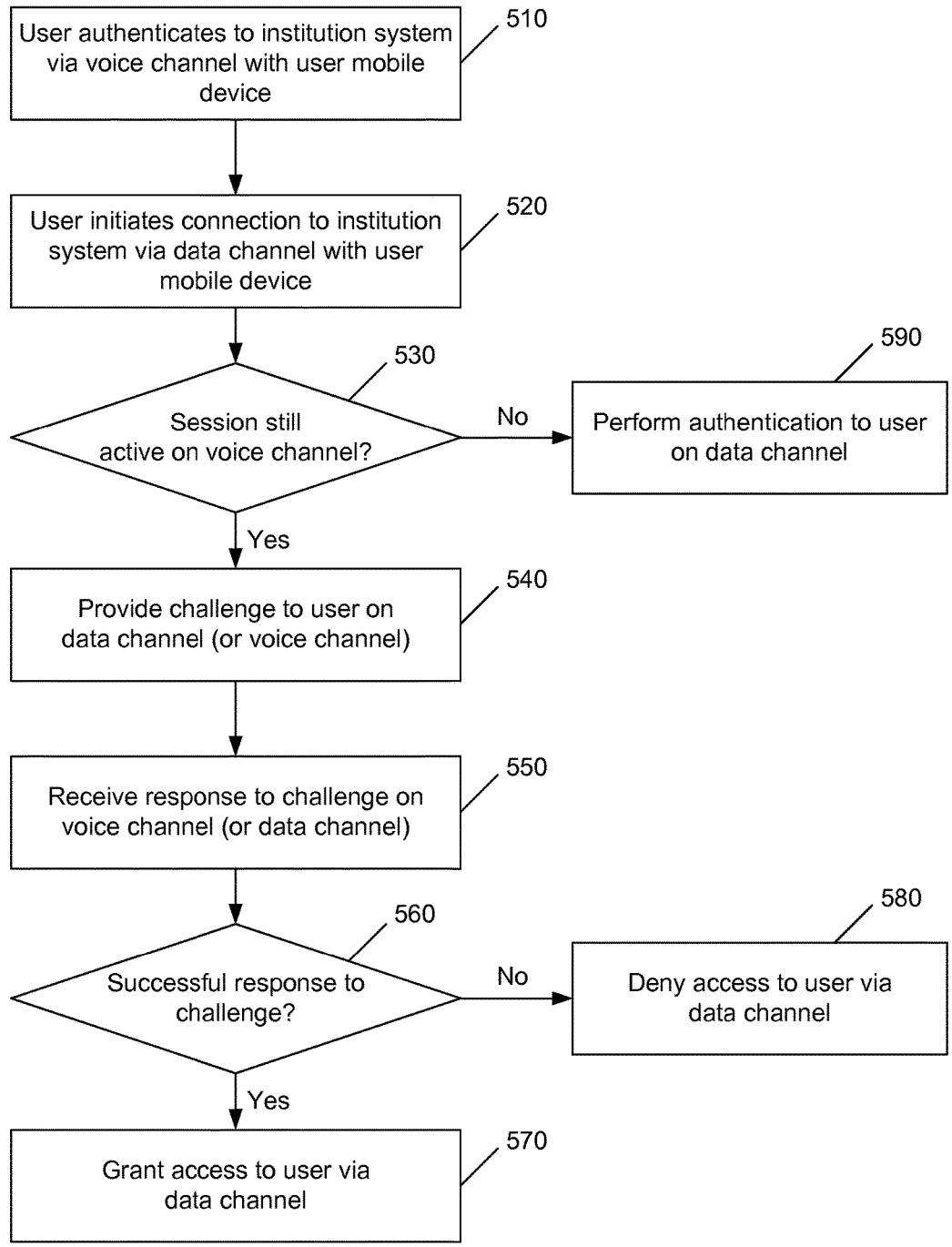
FIG. 5 is an operational flow of another implementation of a method that may be used for communications channel authentication.

FIG. 5 is an operational flow of another implementation of a method 500 that may be used for communications channel authentication. The user may use the same device, such as a user mobile device, to authenticate to multiple communications channels and concurrently access an Institution system through multiple communications channels on the same device. For example, keypads on mobile devices make it difficult to enter complex data, so a user may prefer to use voice to authenticate and request information. But it may be more convenient to the user to receive the results of a query or other request over the browser of the mobile device as opposed to hearing the results over the voice channel of the mobile device.

At 510, the user may authenticate on a first communications channel on a device, such as the voice channel on a user mobile device. At some point, at 520, the user may initiate another connection to the Institution system via a second communications channel with the same device, such as a data channel on the user mobile device. Although the description refers to the first communications channel as a voice channel and the second communications channel as a data channel, each communications channel may be any type of communications channel accessible by the same device, such as a user mobile device.

For example, suppose a user has authenticated (e.g., using strong authentication) to a voice channel via their mobile phone, and would like an account transaction history. The voice channel may ask the user if they would like to view the results on their mobile phone browser (via a data channel) as opposed to listening over the voice channel. In an Implementation, the user may be provided with a text message, an Instant message, or an email with a link to their account transaction history. Using the authentication techniques described herein, the user may authenticate (e.g., weakly) to the data channel and access the account transaction history.

At 530, it may be determined if the user is still in an active session on the voice channel that they initially authenticated to. If so, then a weak authentication technique may be performed, e.g., by issuing a simple challenge to the user on the data channel, at 540. The user may respond to the challenge on the voice channel, at 550. For example, upon selecting the link, prior to providing the transaction history to the user, the user may be authenticated using weak authentication. Instead of strong authentication over the data channel, an challenge question may be presented to the user over the data channel that is answered over the voice channel, referring to something on the data channel such as a number or an image (e.g., "please speak the 6 digit number that is presented on the screen to continue"; "what do you see? press 1 for rabbit, 2 for car, 3 for coffee cup", etc). This allows for quicker, less complex authentication on the data channel for the user. Alternatively, a challenge question may be provided over the voice channel and the user may provide a response over the data channel. In any case, both communications channels are involved in the authentication of the user for access to the Institution system via the data channel (or another communications channel, in an Implementation)

It may be determined at 560 is the user successfully responded to the challenge. If so, then the user may be granted access via the data channel at 570. The user now has access to the Institution system on the same device by both communications channels (the voice channel and the data channel). If the user has not successfully responded to the challenge, the user may not be authenticated for the data channel and access may be denied at 580.

As with the method 400 of FIG. 4, if the user is not already authenticated to the Institution system as determined at 530 or such a session is inactive, strong authentication may be performed at 590 using known authentication techniques for the user to access the Institution system via the data channel of the same user device.

It is contemplated that the techniques described herein may be used with respect to two separate devices each having at least one communications channel, or a single device having multiple communications channels.

Figure 6:
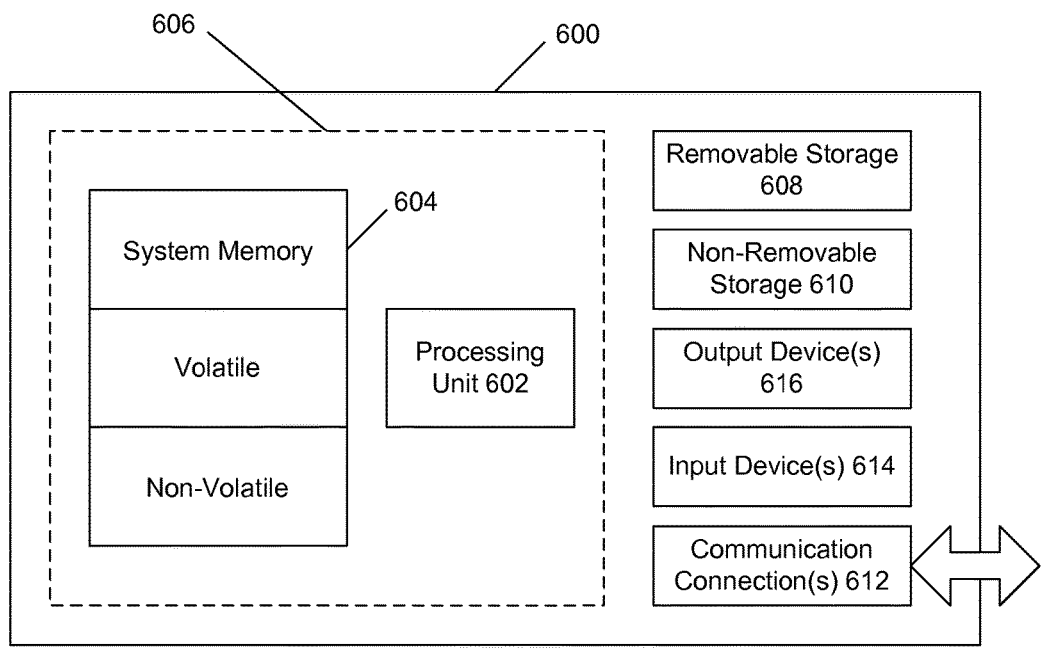
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or Implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and Include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (I.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (Including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a complied or Interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A communications channel authentication method comprising:
    authenticating a user using a first communication channel;
    in response to authenticating the user, establishing a session with a system via the first communication channel with the user;
    receiving a request from the user via a second communications channel;
    determining whether the session with the system via the first communications channel is active or inactive;
    in response to the determining that the session with the system via the first communications channel is active, authenticating the user for access to the system via a second communications channel based on the session with the system via the first communications channel and a single factor authentication; and
    in response to the determining that the session with the system via the first communications channel is inactive, authenticating the user for access to the system via the second communications channel using two or more authentication factors to establish user identity;
    wherein authenticating via the first communications channel and authenticating via the second communications channel are each performed using a user device; and
    wherein the first communications channel is one of a voice channel or a data channel and the second communications channel is other of the voice channel or the data channel.

2. The method of claim 1, wherein authenticating via the first communications channel is performed using a first user device and authenticating via the second communications channel is performed using the first user device in conjunction with a second user device.

3. The method of claim 2, wherein authenticating via the second communications channel comprises receiving a challenge from the system via one of the first communications channel or the second communications channel and responding to the challenge via the other of the first communications channel or the second communications channel.

4. The method of claim 1, wherein authenticating via the first communications channel is performed using a two-factor authentication.

5. The method of claim 1, wherein the system is an institution system.

6. A non-transitory computer-readable medium coupled to at least one computer having instructions stored thereon which, when executed by the at least one computer, cause the at least one computer to perform operations comprising:
    authenticating a user using a first communication channel;
    in response to authenticating the user, establishing a session with a system via the first communication channel with the user;
    receiving a request from the user via a second communications channel;
    determining whether the session with the system via the first communications channel is active or inactive;
    in response to the determining that the session with the system via the first communications channel is active, authenticating the user for access to the system via a second communications channel based on the session with the system via the first communications channel and a single factor authentication; and
    in response to the determining that the session with the system via the first communications channel is inactive, authenticating the user for access to the system via the second communications channel using two or more authentication factors to establish user identity;
    wherein authenticating via the first communications channel and authenticating via the second communications channel are each performed using a user device; and
    wherein the first communications channel is one of a voice channel or a data channel and the second communications channel is other of the voice channel or the data channel.

7. The non-transitory computer-readable medium of claim 6, wherein authenticating via the first communications channel is performed using a first user device and authenticating via the second communications channel is performed using the first user device in conjunction with a second user device.

8. The non-transitory computer-readable medium of claim 7, wherein the instructions that authenticate via the second communications channel comprise instructions that receive a challenge from the system via one of the first communications channel or the second communications channel and respond to the challenge via the other of the first communications channel or the second communications channel.

9. The non-transitory computer-readable medium of claim 6, wherein authenticating via the first communications channel is performed using a two-factor authentication.

10. The non-transitory computer-readable medium of claim 6, wherein the system is an institution system.

11. A communications channel authentication system, comprising:
    at least one computer; and
    a non-transitory computer-readable medium coupled to the at least one computer having instructions stored thereon which, when executed by the at least one computer, cause the at least one computer to perform operations comprising:
        authenticating a user using a first communication channel;

in response to authenticating the user, establishing a session with a system via the first communication channel with the user;

receiving a request from the user via a second communications channel;

determining whether the session with the system via the first communications channel is active or inactive;

in response to the determining that the session with the system via the first communications channel is active, authenticating the user for access to the system via a second communications channel based on the session with the system via the first communications channel and a single factor authentication; and in response to the determining that the session with the system via the first communications channel is inactive, authenticating the user for access to the system via the second communications channel using two or more authentication factors to establish user identity;

wherein authenticating via the first communications channel and authenticating via the second communications channel are each performed using a user device; and wherein the first communications channel is one of a voice channel or a data channel and the second communications channel is other of the voice channel or the data channel.

12. The communications channel authentication system of claim 11, wherein authenticating via the first communications channel is performed using a first user device and authenticating via the second communications channel is performed using the first user device in conjunction with a second user device.

13. The communications channel authentication system of claim 12, wherein authenticating via the second communications channel comprises receiving a challenge from the system via one of the first communications channel or the second communications channel and responds to the challenge via the other of the first communications channel or the second communications channel.

14. The communications channel authentication system of claim 11, wherein authenticating via the first communications channel is performed using a two-factor authentication.

15. The communications channel authentication system of claim 11, wherein the system is an institution system.

* * * * *

UNITED STATES PATENT AND TRADEMARK OFFICE
CERTIFICATE OF CORRECTION

PATENT NO. : 9,742,756 B1  
APPLICATION NO. : 15/003499  
DATED : August 22, 2017  
INVENTOR(S) : Teddy Joseph Edmond Voutour Page 1 of 1

It is certified that error appears in the above-identified patent and that said Letters Patent is hereby corrected as shown below:

In the Abstract:

Column 2, Line 1, delete "Institution" and insert -- institution --, therefore.

Column 2, Line 3, delete "Institution" and insert -- institution --, therefore.

Column 2, Line 7, delete "Institution" and insert -- institution --, therefore.

Column 2, Line 10, delete "Institution" and insert -- institution --, therefore.

Column 2, Line 12, delete "Institution" and insert -- institution --, therefore.

Signed and Sealed this  
Second Day of January, 2018

Joseph Matal  
*Performing the Functions and Duties of the*  
*Under Secretary of Commerce for Intellectual Property and*  
*Director of the United States Patent and Trademark Office*